United States Patent Office 3,634,310
Patented Jan. 11, 1972

3,634,310
PELLETING AGENT FOR CARBON BLACK
Arthur E. Frazier, Borger, Tex., assignor to
Phillips Petroleum Company
No Drawing. Filed July 9, 1969, Ser. No. 840,520
Int. Cl. B01j 2/00; C08c 11/18
U.S. Cl. 260—41.5
8 Claims

ABSTRACT OF THE DISCLOSURE

The use of an in situ-prepared ammonium nitrate solution as a pelleting agent to facilitate the pelleting of carbon black is shown to be superior in regard to scorch and tensile of the rubber into which the carbon black is subsequently blended.

This invention relates to carbon black.

In one of its more specific aspects, this invention relates to carbon black pelleting additives and their effect upon the rubber in which the black is subsequently incorporated.

Carbon black is frequently pelleted after recovery from smoke. This pelleting is carried out in the presence of an aqueous solution of an additive which facilitates the formation of the pellets. Frequently, such aqueous solutions adversely affect the scorch time and tensile strength of the rubber into which the carbon black is blended.

Many pelleting agents are known in the art. Some of these are molasses, water soluble hydroxides, nitric acid, and ammonium nitrate. Most of these are employed in about the same concentrations, that is, preferably from about 1 to about 25 percent weight by weight based upon the carbon black.

The use of ammonium nitrate as a pelletizing agent is known. It is preferably used in an amount of about 1 to about 25 percent by weight based upon the weight of the carbon black. The addition of such an agent is generally made in the usual manner, that is, the ammonium nitrate salt is added to the aqueous carbon black slurry or the aqueous ammonium nitrate solution is added to the carbon black and the pellets are formed from the slurry after which they are dried. Thereafter, they are known in the art.

There has now been discovered a method of employing ammonium nitrate as a pelleting agent which gives improved results. This invention provides such a method.

According to the method of this invention there is provided a method of pelleting carbon black which comprises forming the aqueous solution of ammonium nitrate by the interreaction of ammonium hydroxide and nitric acid in the presence of water and pelleting the black in the presence of the aqueous solution so formed. The solution of ammonium nitrate can be formed in the presence or the absence of the carbon black to be pelleted.

The method of this invention is based upon the discovery that in situ preparation of ammonium nitrate gives results superior to that method of pelleting in which ammonium nitrate is employed as a salt or as an aqueous solution of the salt which is added directly to the carbon black; this is to say, it has been discovered in situ preparation of ammonium nitrate, by the individual addition of ammonium hydroxide and nitric acid to the pelleting water produces carbon black pellets which impart to the rubber into which the black is subsequently blended a higher tensile and scorch time than results from the incorporation of carbon black pelleted with the use of the preprepared ammonium nitrate salt.

There is no critical time after the in situ formation of the solution within which it is employed. In the examples which follow, all samples were employed within a reasonable time of their formation.

In order to show the unexpected results when employing the method of this invention, a rubber recipe was compounded, there being added to it in each of five instances carbon black pelleted with ammonium nitrate prepared in various methods. In each instance the rubber recipe was as follows:

| Component: | Parts by weight |
|---|---|
| Carbon black | 75 |
| Cis-4, 1203 [1] | 50 |
| Philprene 1712 [1] | 68.75 |
| Philrich 5 [1] | 31.25 |
| ZnO | 3 |
| Stearic acid | 2 |
| Wingstay 100 | 1 |
| Santoflex AW | 2 |
| Paraffin wax | 2 |
| Sulfur | 2.1 |
| NOBS Special | 1.4 |

[1] Trademark—Phillips Petroleum Company.

Wingstay 100: Diaryl-p-phenylene diamine
Santoflex AW: 6-ethoxy-1,2 dihydro-2,2,4-trimethyl quinoline
NOBS Special: N-oxydiethylene-2-benzothiazyl sulfenamide
Cis-4 1203: [1] A high cis polybutadiene elastomer, polymerized in solution, having a Mooney viscosity (ML 4 at 212° F.) of about 45
Philprene 1712: [1] (ASTM 1419–61T) An emulsion polymerized butadiene-styrene copolymer containing about 37.5 parts by weight of a highly aromatic processing oil.

In all runs, the carbon black was pelleted in the conventional manner, employing an aqueous solution of the pelleting agent, the weight of the aqueous solution being about equal to the weight of the carbon black. Thereafter, the black was dried in the usual manner.

In Run No. 1, the aqueous pelleting solution contained 8 weight percent ammonium nitrate formed by addition of the salt to the water.

In Run No. 2, the aqueous pelleting solution contained about 7 weight percent ammonium nitrate formed by adding 4 parts by weight of ammonium hydroxide to 5.5 parts by weight of nitric acid. Since stoichiometrically about 3 parts by weight of ammonium hydroxide react with about 5.5 parts by weight of nitric acid to form 7 parts of ammonium nitrate, the pelleting solution may be considered as containing 7 parts by weight of in situ-formed ammonium nitrate and one part by weight ammonium hydroxide. To produce each 100 pounds of pelleting solution containing about 7 weight percent ammonium nitrate and about 1 weight percent ammonium hydroxide, about 7 pounds of ammonium hydroxide (28 weight percent ammonia in water) and about 8 pounds of nitric acid (69 weight percent nitric acid in water) were added to about 84.9 pounds of water.

In Run No. 3, substantially stoichiometric quantities of ammonium hydroxide and nitric acid were mixed in aqueous solution to form about a 7 percent ammonium nitrate pelleting solution. To produce each 100 pounds of pelleting solution containing about 7 weight percent ammonium nitrate, about 5.3 pounds of ammonium hydroxide (28 weight percent ammonia in water) and about 8 pounds of nitric acid (69 weight percent nitric acid in water) were added to about 86.7 pounds of water.

[1] Trademark—Phillips Petroleum Company.

In Run No. 4, about 5.5 parts by weight of nitric acid were reacted with about one part by weight ammonium hydroxide to produce a solution containing about 2.3 weight percent ammonium nitrate and about 3.7 percent nitric acid. To produce each 100 pounds of pelleting solution containing 2.3 weight percent ammonium nitrate and 3.7 weight percent nitric acid, to about 90.3 pounds of water were added about 1.75 pounds of ammonium hydroxide (28 weight percent ammonia in water) and about 8 pounds of nitric acid (69 weight percent nitric acid in water).

In Run No. 5, a solution of about 8 weight percent ammonium nitrate was formed by addition of the salt to the water and 1.0 part by weight of ammonium hydroxide were also added.

Scorch times at 280° F. and tensile strength, p.s.i., 30 minutes, were determined for all rubber samples into which the pelleted black had been incorporated, with the following results:

TABLE I

| Run No. | 1 | 2 | 3 | 4 | 5 |
|---|---|---|---|---|---|
| Additive preparation: | | | | | |
| In situ | | X | X | X | |
| Salt addition | X | | | | X |
| Additive, weight percent of pelleting solution: | | | | | |
| $NH_4NO_3$ | 8.0 | 7.0 | 7.0 | 2.3 | 8.0 |
| $NH_4OH$ | | 1.0 | | | 1.0 |
| $HNO_3$ | | | | 3.7 | |
| Rubber tests: | | | | | |
| Scorch time at 280° F., min., 5 point rise | 20.7 | 22.8 | 24.1 | 23.6 | 21.6 |
| Tensile, p.s.i., 30 min. | 1,900 | 2,050 | 2,205 | 1,980 | 2,120 |

In all instances, the carbon black used had a nitrogen surface area of about 85 m.$^2$/gm., a structure, pelleted, of about 70 cc./100 gm., and a Photelometer reading of about 95. The pelleted mixture was made up of 30 to 40 pounds of water and 70 to 60 pounds of carbon black. The mixture was pelleted at 100° F. and dried at 400° F.

These data indicate that improved values of scorch time and/or tensile strength are realized with the in situ preparation of the ammonium nitrate. In all runs of the invention, that is, in Runs 2, 3 and 4, the scorch time was improved as indicated by the increase in scorch time as shown. Also, tensile strength was increased in the invention runs over base Run 1. Run 3 of the invention also showed an increase in scorch time over base Run 5. Runs 2 and 4 of the invention did not show increased tensile values over that of base Run 5 probably because less ammonium nitrate was present in the solutions than in base Run 5.

The method of this invention is applicable to all carbon blacks and to all methods of pelleting and drying. It further contemplates the use of in situ-prepared pelleting agent in the usual quantities from about one to about 25 percent, and preferably from about 5 to about 10 percent by weight, based upon the weight of the carbon black. It also includes the addition of either the ammonia or ammonium hydroxide to the nitric acid solution or the addition of nitric acid to the ammonium hydroxide solution, either being carried out in the presence or absence of the black to be pelleted. The ammonium nitrate solution can be formed and employed in the presence of extraneous additives such as molasses, and the like. Its use is also satisfactory with any rubber recipe into which carbon black is conventionally blended in the amount to which carbon black is conventionally incorporated.

It will be evident that various modifications can be made to this invention in light of the above disclosure. Such, however, are considered as being within the scope of the invention.

What is claimed is:

1. The method of pelleting carbon black with an aqueous solution of ammonium nitrate to produce a pelleted carbon black capable of imparting to rubber a higher tensile strength and/or higher scorch time when blended therewith comprising:
   (a) reacting ammonium hydroxide and nitric acid in the presence of water to form an aqueous solution comprising ammonium nitrate, and
   (b) pelleting the carbon black in contact with said aqueous solution.

2. The method as defined in claim 1 in which said solution is employed in an amount sufficient to supply an amount of ammonium nitrate from about 1 to about 25 weight percent of the weight of said carbon black.

3. The method of claim 1 in which the aqueous solution contains a stoichiometric excess of ammonium hydroxide.

4. The method of claim 1 in which the aqueous solution contains a stoichiometric excess of nitric acid.

5. The method of claim 1 in which the aqueous solution is formed in the presence of the carbon black.

6. The method of claim 1 in which the aqueous solution is formed in the presence of molasses.

7. The method of claim 1 in which the amount of the aqueous solution employed is about equal to the weight of the carbon black.

8. A rubber having incorporated therein carbon black pelleted with a pelleting agent formed in accordance with the method of claim 1.

References Cited

Kirk-Othmer, Encyclopedia of Chemical Technology, 2nd ed., vol. 2, p. 324, 1963.

ROBERT F. WHITE, Primary Examiner

J. R. HALL, Assistant Examiner

U.S. Cl. X.R.

264—117